(12) United States Patent (10) Patent No.: US 12,560,843 B2
De Jong et al. (45) Date of Patent: Feb. 24, 2026

(54) LIQUID CRYSTAL DEVICE

(71) Applicant: MERCK PATENT GmbH, Darmstadt (DE)

(72) Inventors: Ties De Jong, Veldhoven (NL); Florian Dhalluin, Veldhoven (NL); Chuan Nie, Veldhoven (NL); Muhammad Ali, Amsterdam (NL)

(73) Assignee: Merck Patent GmbH (DE)

( * ) Notice: Subject to any disclaimer, the term of this patent is extended or adjusted under 35 U.S.C. 154(b) by 0 days.

(21) Appl. No.: 18/882,833

(22) Filed: Sep. 12, 2024

(65) Prior Publication Data

US 2025/0085595 A1     Mar. 13, 2025

(51) Int. Cl.
| | |
|---|---|
| *G02F 1/1345* | (2006.01) |
| *E06B 9/24* | (2006.01) |
| *G02F 1/1343* | (2006.01) |
| *G02F 1/137* | (2006.01) |

(52) U.S. Cl.
CPC .............. *G02F 1/1345* (2013.01); *E06B 9/24* (2013.01); *G02F 1/134309* (2013.01); *G02F 1/13756* (2021.01); *E06B 2009/2464* (2013.01)

(58) Field of Classification Search
CPC .... E06B 9/24; E06B 2009/246; G02F 1/1345; G02F 1/13756; G02F 1/134309
See application file for complete search history.

(56) References Cited

U.S. PATENT DOCUMENTS

| | | | |
|---|---|---|---|
| 2021/0141259 A1* | 5/2021 | Yoshino | G02F 1/13439 |
| 2021/0373392 A1* | 12/2021 | Nie | B32B 23/04 |
| 2024/0367417 A1* | 11/2024 | Jacques | B32B 7/12 |

* cited by examiner

*Primary Examiner* — Mariceli Santiago
(74) *Attorney, Agent, or Firm* — Buchanan Ingersoll & Rooney PC

(57) ABSTRACT

A liquid crystal device for absorbing and/or scattering a controllable amount of traversing light comprises an active layer having a first viewport surface, a second viewport surface, and at least two side surfaces. The first and second viewport surfaces contact respective first and second planar electrodes. The first and second planar electrodes respectively comprise first and second supply areas for receiving a control voltage for controlling the active layer. A first supply contacting device electrically connects to the first supply area, and a second supply contacting device electrically connects to the second supply area. The supply areas and the supply contacting devices each associate to one or more side surfaces, arranged to extend along at least a part of their respective associated sides, wherein the first supply contacting device and the second supply contacting device associate to adjacent side surfaces.

10 Claims, 3 Drawing Sheets

LIQUID CRYSTAL DEVICE

FIELD OF THE INVENTION

Figure 1:
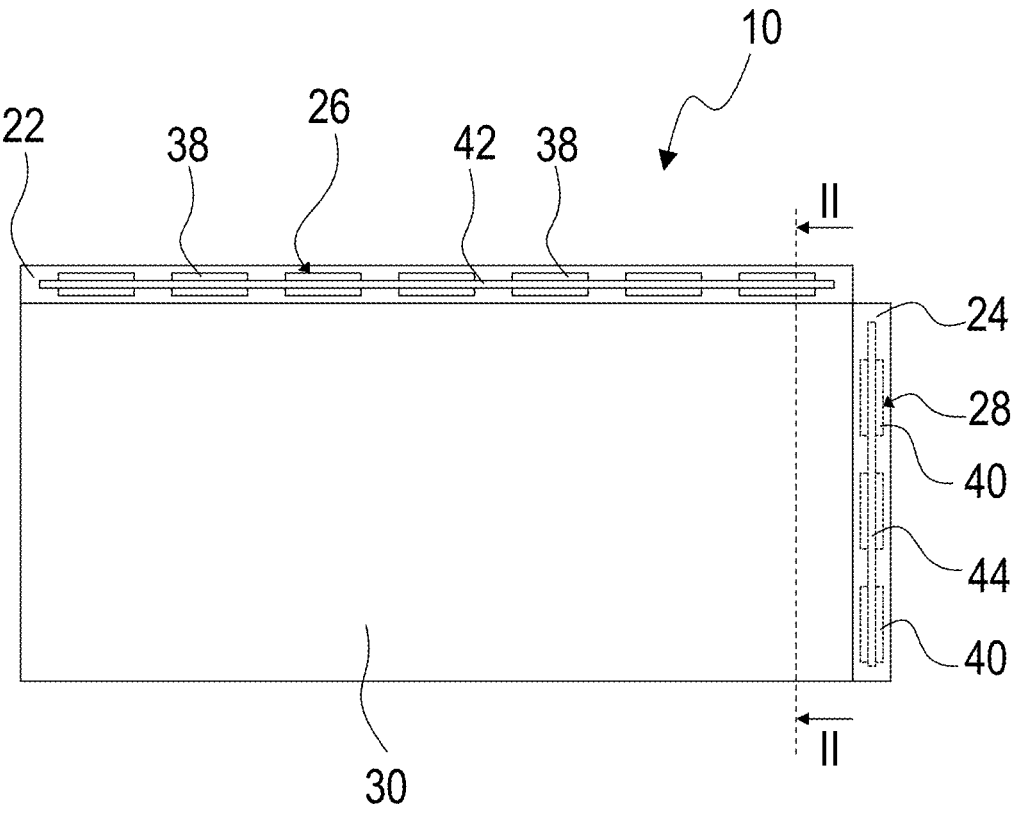

The invention relates to a liquid crystal device for absorbing and/or scattering a controllable amount of traversing light, comprising an active layer having a first viewport surface and a second viewport surface, wherein the first viewport surface is in contact with a first planar electrode and the second viewport surface is in contact with a second planar electrode, wherein the active layer, comprises at least two side surfaces. The invention further relates to a liquid crystal device, in particular a window element, for applications in buildings and vehicles with energy savings and improved comfort.

BACKGROUND OF THE INVENTION

Dynamic glazing, for example solar or privacy glazing, using such liquid crystal devices is based on light absorbing and/or scattering molecules embedded in a liquid crystal host. The mixture of liquid crystal and dye molecules forms an active layer sandwiched between two plates, for example glass plates coated with transparent conductive oxides that form planar electrodes, to form a cell. The cell can be switched between an absorbing state and a transparent state by applying an electric field to the active layer via the planar electrodes.

The electric field is created by application of an AC voltage to the planar electrodes. A typical frequency used is, for example, between 50 and 60 Hz. The AC voltage is applied to the electrodes by a power source connected via a cable to a supply contacting device in contact with a section of the planar electrodes forming a supply area. The supply contacting devices provide contact points for electrical contact with the planar electrodes and for distribution of current. This may be necessary as the planar electrodes themselves may not be easily solderable. Furthermore, planar electrodes have resistive properties that may require a surface contact in order to be able to provide enough control current to quickly establish the control voltage across the active layer which acts as a dielectric in a capacitor. The supply contacting devices may comprise multiple contact surfaces such as solder dots soldered or otherwise fixed to the planar electrodes in electric contact, in particular along an edge or side of the cell.

In many configurations, one or more cells are laminated together or sandwiched between protective cover sheets. The bus bars are arranged on opposing sides of the cell vis-à-vis to each other to achieve an even distribution cherished, steer voltage over the whole area of the viewport. However, the production process of the cells makes arrangement of control cables connected to the supply contacting device complex. The arrangement of bus bars on opposing side of the cell results in an additional cabling step that has to be carried out by hand and is therefore not suitable for current automated insulated glazing unit (IGU) production lines.

Electrically, LC cells act as a large area RC-circuit, the capacitance of which mainly depends on the area of the glazing cell, a cell gap and a dielectric constant of the LC or active layer. The resistance component depends mainly on the aspect ratio and sheet resistance of the unit as it results from the sheet resistance of the planar electrodes. Since the LC cells need to be driven by an AC voltage, they are subject to an RC-effect of voltage drop. This results in a lower effective voltage over the cell, and therefore a loss of visual transmittance in the bright state. Also, the effective distribution of the voltage over the cell will be non-uniform. If the voltage non-uniformity exceeds a certain level, visual artefacts such as a transmittance difference over the viewport of the liquid crystal device may be observed.

SUMMARY OF THE INVENTION

In light of the above, the invention solves the problem of simplifying an automated production process for liquid crystal devices as mentioned above while keeping or even improving the uniformity of the operating properties of the liquid crystal device over the viewport.

To solve the problem, a liquid crystal device for absorbing and/or scattering a controllable amount of traversing light comprises an active layer having a first viewport surface and a second viewport surface, wherein the first viewport surface is in contact with a first planar electrode and the second viewport surface is in contact with a second planar electrode, wherein the active layer, comprises at least two side surfaces, wherein the first planar electrode comprises a first supply area for receiving a control voltage for controlling the active layer, the second planar electrode comprises a second supply area for receiving the control voltage, wherein a first supply contacting device is arranged to electrically connect to the first supply area and a second supply contacting device is arranged to electrically connect to the second supply area, wherein the supply areas are each associated to one or more side surfaces, wherein the supply contacting devices are each associated to one or more side surfaces, and are arranged to extend along at least a part of their respective associated sides, wherein the first supply contacting device and the second supply contacting device are associated to adjacent side surfaces.

As the supply contacting devices, are thereby arranged around a common corner of the liquid crystal device and, incidentally, the active layer, the cables may be arranged to be guided out on that corner. It is no longer necessary to guide cables over the whole side of the liquid crystal device. This simplifies production of the liquid crystal device.

In some embodiments, one or more of the contact devices extends over less than 90%, 85%, 80%, 75%, 70%, 65%, 60%, 50%, 40%, 30%, 20% or 10% of a side of the active layer.

In this way, if the bus bar is shorter than the side of the liquid crystal device it is arranged on, a more uniform distribution of voltage and/or current over the viewport is obtained.

In some embodiments, the first supply contacting device is spaced from the side surface associated to the second supply contacting device and/or from the second supply contacting device.

Through this arrangement, a gap is formed between a common corner of the supply contacting devices and the first supply contacting device. This further improves uniformity of the distribution of voltage and/or current over the viewport.

In some embodiments, the first planar electrode comprises a third supply area and/or the second planar electrodes comprises a fourth supply area, each section extending along one of the side surfaces previously unassociated.

This allows for the connection of further supply contacting devices, possibly leading to more uniform operational characteristics of the liquid crystal device.

In some embodiments, the first supply contacting device extends at least partly over and is in electrical contact with the third supply area and/or the second supply contacting device extends at least partially over and is in electrical contact with the fourth supply area.

This allows supply contacting devices to be arranged in opposing corners of the liquid crystal device which is less complex to realise and finish than bus bars arranged on opposing sides of the liquid crystal device. Furthermore, the uniformity of control voltage distribution between the planar electrodes is improved, reducing voltage drop over the viewport surface and improving the optical characteristics, for example a transparent state of the active layer.

In some embodiments, the active layer comprises at least four side surfaces.

Liquid crystal devices having four or more sides stand to profit the most from the increased uniformity achievable by the above-mentioned features.

In some embodiments, one of the supply areas is longer than 1.5 m.

Liquid crystal devices having very long side surfaces stand to profit the most from the increased uniformity achievable by the above-mentioned features.

In some embodiments, at least one of the supply contacting devices is noncontinuous in that it comprises multiple contact surfaces not in immediate contact with each other.

This does not preclude an electric contact via, for example a cabling device, only immediate contact between the contact surfaces. The contact surfaces may serve as an intermediary between, for example, cabling, which may not be easy to connect to the planar electrodes directly, and the planar electrodes.

In some embodiments, the contact surfaces of one supply contacting device may be arranged spaced apart from each other, in particular along their associated sides.

This allows for a very even distribution of voltage, at least in the proximity of the contact surfaces.

In some embodiments, the distances between the contact surfaces of one or more of the supply contacting devices vary along its extent. This allows for further customisation of the control voltage distribution within the liquid crystal device.

The liquid crystal device, in particular the liquid crystal window, can be used in sustainable glazing applications in buildings and vehicles, in particular by giving energy savings with respect to lighting, cooling and/or heating and by positively impacting the lifecycle e.g. in terms of maintenance, while in addition providing improved thermal and visual comfort.

Further features and variants of the invention will be apparent to the skilled person, in particular from the enclosed drawings which show example embodiments of the invention.

BRIEF DESCRIPTION OF THE DRAWING FIGURES

Figure 2:
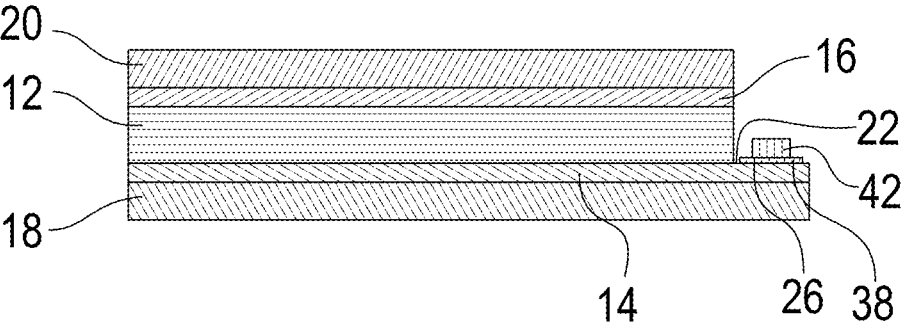
Figure 3:
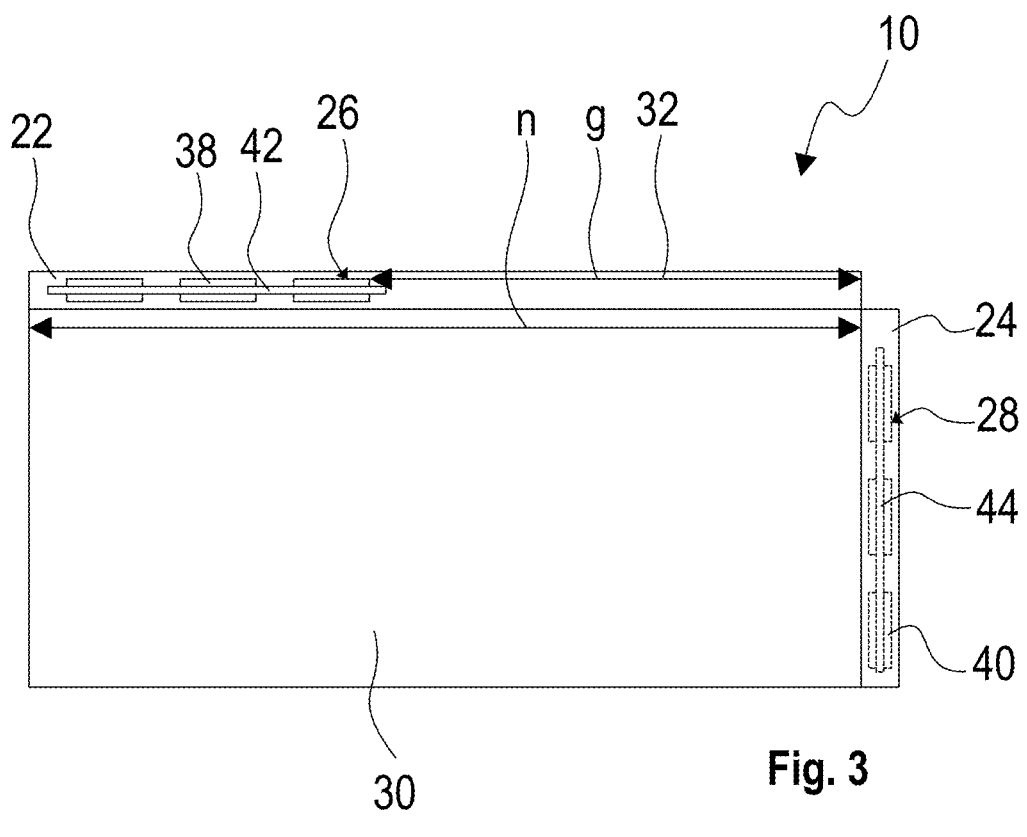
Figure 4:
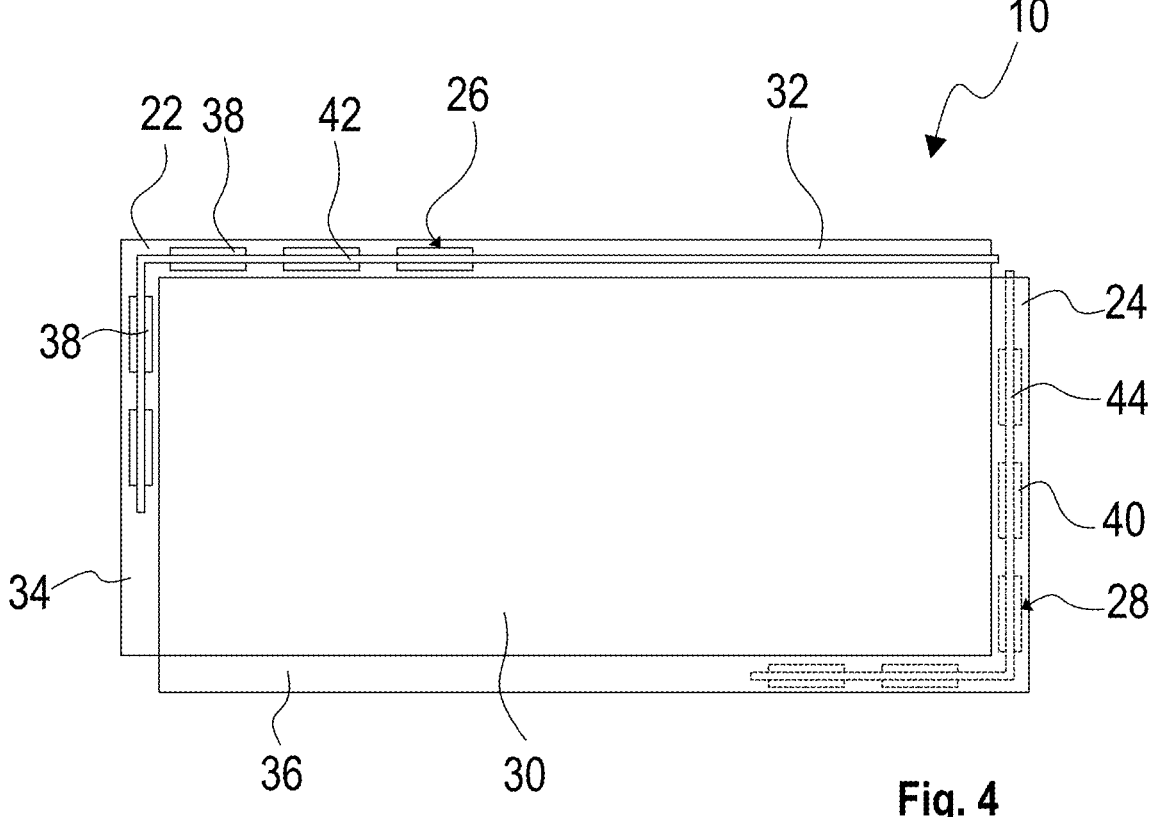
Figure 5:
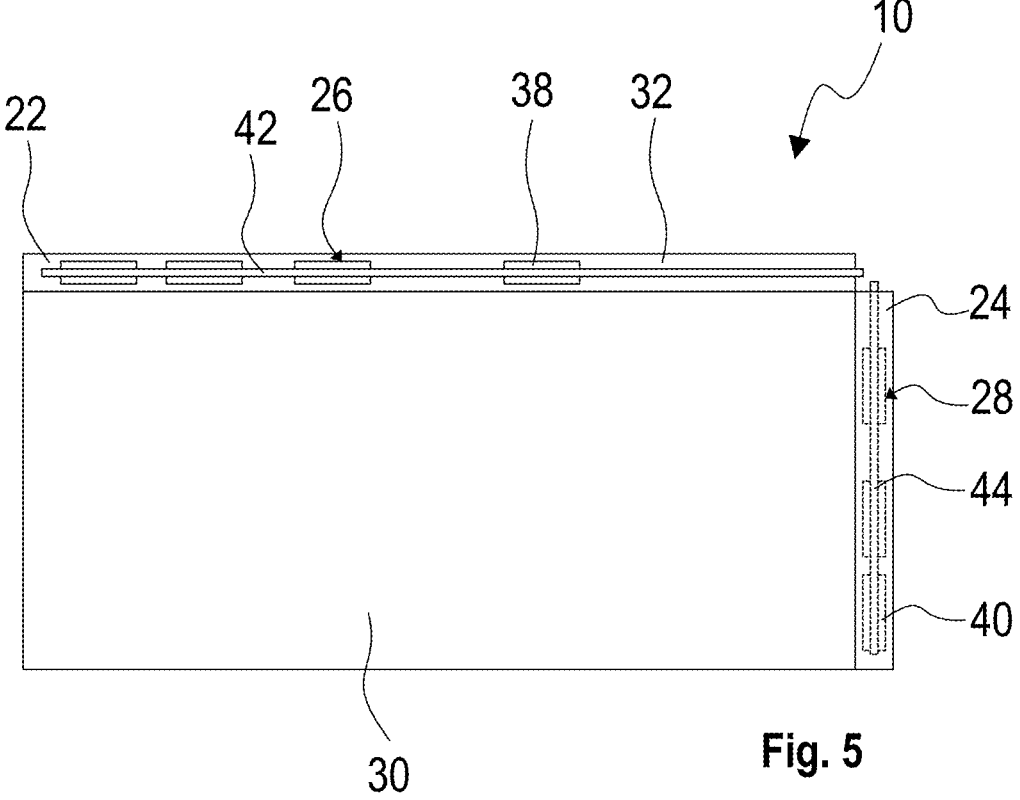

The figures show:

FIG. 1 a top view of a liquid crystal device according to an embodiment of the invention;

FIG. 2 a cross-section through the liquid crystal device along line II-II of FIG. 1;

FIG. 3 a top view of a liquid crystal device according to an embodiment of the invention;

FIG. 4 a top view of a liquid crystal device according to an embodiment of the invention and FIG. 5 a top view of a liquid crystal device according to an embodiment of the invention having unevenly spaced contact surfaces.

The figures contain partially simplified, schematic representations. In part, identical reference signs are used for similar, but possibly not identical elements. Different views of identical elements could be scaled differently. Directional indications such as "left", "right", "top", "up" and "bottom" are to be understood with reference to the respective figure and may vary in the individual representations with respect to the object depicted.

Furthermore, elements are not necessarily shown to scale relative to one another, in particular to simplify and clearly illustrate their functional relationship. Insofar as process steps or elements are provided with enumerative designations such as, for example, "first", "second", "third" or "further", these designations, insofar as nothing else is explicitly disclosed, serve merely to differentiate and do not imply any sequence or hierarchy.

In FIGS. 1, 3, 4 and 5, features that may be visible through transparent parts but are arranged on surfaces facing away from the observer are drawn using broken lines.

DETAILED DESCRIPTION OF THE INVENTION

The following detailed description may be understood with reference to the drawing figures, in which the elements illustrated are identified by reference numeral as follows:

10 liquid crystal device
12 active layer
14 first planar electrode
16 second planar electrode
18 first transparent carrier
20 second transparent carrier
22 first supply area
24 second supply area
26 first supply contacting device
28 second supply contacting device
30 viewport
32 gap
34 third supply area
36 fourth supply area
38 first contact surfaces
40 second contact surfaces
42 first cable device
44 second cable device A liquid crystal device 10 as shown in FIGS. 1 and 2 comprises an active layer 12 arranged between a first planar electrode 14 and a second planar electrode 16. The active layer 12 and the planar electrodes 14, 16 are in contact with each other. The first planar electrode 14 is carried on a first transparent carrier 18 and the second planar electrode 16 is carried on a second transparent carrier 20. The active layer 12, the planar electrodes 14, 16 and the transparent carriers 18, 20 are flat in the sense that their extent within or parallel to a common plane of extent is substantially larger than their extent perpendicular to said plane. Together, the active layer 12, the planar electrodes 14, 16 and the transparent carriers 18, 20 are stacked so that they form a viewport 30, the transparency and/or translucency of which is controllable by a control voltage applied to the planar electrodes 14, 16. Those surfaces of the active layer 12 that are supposed to be looked through when the liquid crystal device 10 is transparent are also the surfaces of the active layer 12 that are in contact with the planar electrodes 14, 16. These surfaces of the active layer 12 may thus be identified as a first viewport surface in contact with the first planar electrode 14 and a second viewport surface in contact with the second planar electrode 16.

Other sides of the active layer 12 form side surfaces that are oriented in other directions, for example, to the left, right, up or down direction in FIG. 1. In many embodiments, the side surfaces are oriented perpendicular to the viewport surfaces. For example, a liquid crystal device 10 that is substantially rectangular as shown in FIG. 1, may have four side surfaces. The totality of side surfaces may also be referred to as a perimeter of the active layer 12.

The active layer 12 may in many embodiments comprise an optically active material generally controllable by an electric field applied to it, such as liquid crystal. The active layer 12 may, in some embodiments, in addition to the optically active material, comprise other materials. For example, the active layer 12 may comprise, on its side surfaces, a glue component that encloses the optically active material, for example to protect it from outside influences such as dirt, or to keep the optically active material, which may be a liquid, from flowing out from between the transparent carriers 18, 20. The active layer 12 may also comprise spacers arranged to ensure a uniform distance between the transparent carriers 18, 20 and/or the planar electrodes 14, 16 over the whole viewport 30.

The planar electrodes 14, 16 may, in some embodiments, comprise multiple layers, such as any combination of an alignment layer, an insulating layer, a conductive layer, a barrier layer and/or any other expedient layer.

A section of the first planar electrode 14 and the first transparent carrier 18 protrudes in parallel to the plane of extent over one side surface of the active layer 12 to form a first supply area 22. A section of the second planar electrode 16 and the second transparent carrier 20 protrudes in parallel to the plane of extent over another side surface of the active layer 12 to form a second supply area 24. A first supply contacting device 26 is arranged in electrical contact with the first planar electrode 14 in the first supply area 22 to supply the first planar electrode 14 with a control voltage. A second supply contacting device 28 is arranged in electrical contact with the second planar electrode 16 in the second supply area 24 to supply the second planar electrode 16 with the control voltage.

The control current flows through the planar electrodes 14, 16 towards the active layer 12 which acts as an insulator and/or dielectric, forming a capacitor between the planar electrodes 14, 16. The control voltage or, more specifically, a control voltage gradient, is established across the electrodes 14, 16 over the active layer 12 by charging/discharging that capacitor. The supply contacting devices 26, 28 each are elongated to extend along the supply areas 22, 24 and thus along sides of the planar electrodes 14, 16 and the active layer 12. They are arranged to form electric contacts with the supply areas 22, 24 such that the control current is distributed over their extent.

The supply areas 22, 24 and the supply contacting devices 26, 28 are arranged substantially at right angles relative to each other due to the rectangular base of the active layer 12. In some embodiments, the supply contacting devices 26, 28 may be arranged to enclose any angle between them, in particular an angle between 45° and 135°, 75 and 105°, an angle between 85° and 95° or an angle between 89° and 91°.

The supply areas 22, 24 are arranged on adjacent sides of the active layer 12 to allow for simplified production of the liquid crystal device 10. Production machines used to produce liquid crystal device 10 can be simplified and automated to a higher degree if the supply contacting devices 26, 28 are arranged on adjoining sides of the active layer 12. This is due, in particular, to the simplified access to those sides and edges of the active layer 12 that do not have a supply area 22, 24 arranged next to them.

In the presently described embodiment, the active layer 12 extends in a rectangular manner, forming a rectangular base with four side surfaces, wherein four of its sides are not covered by one of the planar electrodes 14, 16 and are thus open for arrangement of supply areas 22, 24 on them. In some embodiments, the active layer 12 may be formed differently, for example with a non-rectangular four-edged base, a base having more than four open sides, five sides, six or more sides or one or more non-flat sides such as curved, ellipsoid, or circular sides.

The first supply contacting device 26 comprises multiple first contact surfaces 38 and the second supply contacting device 28 comprises multiple second contact surfaces 40. The contact surfaces 38, 40 are electrically connected to the planar electrodes 14, 16 to distribute the control current used to generate the control voltage over a larger surface of the planar electrodes 14, 16 than would be possible with a simple solder point. In this way, current density and thus resistive losses are reduced.

The control voltage is provided to the supply contacting devices 26, 28 by means of a first cable device 42 and a second cable device 44. The cable devices 42, 44 may be connected, in particular soldered, to one or more of the contact surfaces 38, 40. In some embodiments, the cable devices 42, 44 may be provided with materials that allow them to directly contact the planar electrodes 14, 16 and thus become part of the supply contacting devices 26, 28. The cable devices 42, 44 may be further extended to connect to a control device which is outside the scope of this application. In particular, the cable devices 42, 44 may be extended to run along the side surfaces associated with the supply areas 22, 24 and/or the supply contacting devices 26, 28 to the corner on which the side surfaces associated are adjacent.

In some embodiments, one of which is shown in FIG. 3, one of the supply contacting devices 26, 28, in this embodiment the second supply contacting device 28, may be spaced apart from the other (the first, in this embodiment) supply contacting device 26. Thus, as a corner of the active layer 12 is enclosed between the supply contacting devices 26, 28, one of the supply contacting devices 26, 28 may be arranged closer to the corner than the other.

In particular, the side of the active layer 12 on which the first supply contacting device 26 is arranged may have a length n, with the first supply contacting device 26 being spaced from the second the corner and/or the second supply contacting device 28 by a gap 32 of length g which may be, for example, between 10% and 80%, between 20% and 70%, or up to 10%, 20%, 30%, 40%, 50% or 60% of n in length.

In some embodiments, one of which is shown in FIG. 4, one or more of the supply contacting devices 26, 28 may have a length that is, for example, between 40% and 90%, between 70% and 90%, less than 50%, less than 60%, less than 70%, less than 80%, less than 85% or less than 90% of n. The supply contacting devices 26, 28 may, in some embodiments, be arranged adjacent to each other or separated by a minimal gap 32 of less than 5% of n. Furthermore, supplementary supply areas such as, for example, a third supply area 34 and/or a fourth supply area 36, may be provided to allow for arrangement of the first supply contacting device 26 and/or the second supply contacting device 28.

In particular, the supply contacting devices 26, 28 may each be arranged across a corner, and associated with two side surfaces, each covering parts of two supply areas 22, 24, 34, 36. In some embodiments, the arrangement of supply contacting devices 26, 28 may be asymmetrical. For example, in an arrangement comprising an active layer 12 that has five side surfaces, it may be convenient to associate one first supply contacting device 26 with one of the side surfaces and associate two second one supply contacting devices 28 with adjacent side surfaces. Many other such arrangements are possible. Configurations in which there is one first supply contacting device 26 and one, two or three second supply contacting devices 28 are provided, are also possible. Furthermore, it is possible to have configurations, in which, of five side surfaces, two are associated with first supply contacting devices 26 and three are associated with the second supply contacting devices 28 or, in a different configuration, for are associated with first supply contacting devices 26 and one is associated with a second supply contacting device 28.

In some embodiments, the first supply area 22 and/or the second supply area 24 may protrude substantially in a rectangular fashion over the side surfaces.

In some embodiments, the active layer 12 may be sandwiched between the first planar electrode 14 and the second planar electrode 16. In some embodiments, multiple active layers 12 may be stacked one over another and separated, for example, by transparent carriers 18, 20 of various thicknesses. For example, the outermost transparent carriers 18, 20 may have a larger thickness to provide support to the layers therebetween while the transparent carriers 18, 20 arranged between the active layers 12 may be less thick to avoid making the liquid crystal device 10 too heavy.

In some embodiments, one of which is shown as an example in FIG. 5, when the first supply contacting device 26 comprises a multitude of first contact surfaces 38 and/or the second supply contacting device 28 comprises a multitude of second contact surfaces 40, it may be helpful not to arrange the contact surfaces 38, 40 with an even spacing. For example, a spacing between the contact surfaces 38, 40 may be the smaller the farther they are from the corner where the adjacent associated side surfaces meet. In the case shown in FIG. 5, the contact surface 38 closest to the gap 32 has a larger spacing to the next contact surface 38 to its left than that contact surface 38 has to its left and so on until the last contact surface 38.

To determine, for example, which of the embodiments shown above is the most usefully applicable to a particular liquid crystal device 10 and also to determine, for example, a gap 32 length g, a current and voltage distribution simulation using an FEM (finite elements model) representation of the electrical characteristics of the active layer 12, the first planar electrode 14 and the second planar electrode 16 may be used. The choice of a particular embodiment may also depend on other factors, for example, active layers 12 that have an aspect ratio that is far from 1, such as 0.2 or 5, may require a larger gap 32. Also, active layers 12 that are comparatively large, for example those that have one side that is longer than 1 m, 1.5 m or 2 m, may require a larger gap 32. The choice of a convenient size of the gap 32 may also depend on the electrical characteristics of the active layer 12 and the planar electrodes 14, 16. In particular, a dielectric constant of the active layer 12, a sheet resistance of for example a conductive coating that the planar electrodes 14, 16 are made of, a cell gap in a specific range and/or a capacitance or RC constant of the liquid crystal device 10 may all influence which of the embodiments together with what gap sizes may be the most expedient to use.

The choice of embodiment and parameters would, in general, be made to achieve characteristics over the viewport 30 that are as uniform as possible. In particular, if the characteristics of the liquid crystal device 10 over the viewport 30 are not uniform enough, this will be visible as brighter or darker areas and generally uneven aspect of the liquid crystal device 10 in use.

In some embodiments, all or some of the supply contacting devices 26, 28 may be shorter than their respective supply areas 22, 24.

In some embodiments, the first cable device 42 and the second cable device 44 may be formed as so-called bus bars, connecting only their respective connecting surfaces 38, 40 such as shown in FIG. 3, and connected by exterior cables. In some embodiments, such as shown in FIGS. 4 and 5, the cable devices 42, 44 may extend to a common corner where they can be easily connected to external control circuits.

In general, side surfaces may be limited by edges which form limits of the side surfaces meeting at their location. In some embodiments, limits of sides may be defined by places where a surface normal gradient value of the side surface exceeds a predefined threshold. Such places may be, for example straight edges such as edges where surfaces meet at a right (or any other) angle, or round edges, wherein the radius of the round edge is less than, for example, 5 mm, 1 mm or 0.1 mm.

Optional features of the invention are designated with "may". Accordingly, there are also further embodiments and/or embodiments of the invention which additionally or alternatively have one or more of the respective feature or features.

From the presently disclosed combinations of features, isolated features can also be picked out, if necessary, and used in combination with other features to delimit the subject-matter of the claims, while removing the structural and/or functional relationship that may exist between the features.

The invention claimed is:

1. A liquid crystal device for absorbing and/or scattering a controllable amount of traversing light, comprising an active layer having a first viewport surface and a second viewport surface, wherein the first viewport surface is in contact with a first planar electrode and the second viewport surface is in contact with a second planar electrode, wherein the active layer comprises at least two side surfaces, wherein
the first planar electrode comprises a first supply area for receiving a control voltage for controlling the active layer, the second planar electrode comprises a second supply area for receiving the control voltage, wherein
a first supply contacting device is arranged to electrically connect to the first supply area and a second supply contacting device is arranged to electrically connect to the second supply area, wherein
the supply areas are each associated to one or more side surfaces, wherein the supply contacting devices are each associated to one or more side surfaces, and are arranged to extend along at least a part of their respective associated sides,
wherein the first supply contacting device and the second supply contacting device are associated to adjacent side surfaces, arranged around a common corner of the liquid crystal device, wherein one or more of the contact devices extends over less than 80% of a length of its associated side surface of the active layer, and
wherein the first supply contacting device is spaced from the side surface associated to the second supply contacting device and/or from the second supply contacting device.

2. The liquid crystal device according to claim 1, wherein one or more of the contact devices extends over less than 75% of a length of its associated side surface of the active layer.

3. The liquid crystal device according to claim 1, wherein the first planar electrode comprises a third supply area and/or the second planar electrode comprises a fourth supply area, each section extending along one of the side surfaces previously unassociated.

4. The liquid crystal device according to claim 3, wherein the first supply contacting device extends at least partly over and is in electrical contact with the third supply area and/or the second supply contacting device extends at least partly over and is in electrical contact with the fourth supply area.

5. The liquid crystal device according to claim 1, wherein the active layer comprises at least four side surfaces.

6. The liquid crystal device according to claim 1, wherein one of the supply areas is longer than 1.5 m.

7. The liquid crystal device according to claim 1, wherein at least one of the supply contacting devices is non-continuous in that it comprises multiple contact surfaces not in immediate contact with each other.

8. The liquid crystal device according to claim 7, wherein the contact surfaces of one supply contacting device are arranged spaced apart from each other.

9. The liquid crystal device according to claim 8, wherein a distance between the contact surfaces of one or more of the supply contacting devices varies along its extent.

10. The liquid crystal device according to claim 8, wherein the contact surfaces of one supply contacting device are arranged spaced apart from each other along their associated sides.

* * * * *